United States Patent [19]
Green

[11] Patent Number: 5,393,289
[45] Date of Patent: Feb. 28, 1995

[54] ROOFING HANDROLLER

[76] Inventor: Michael P. Green, 31 Sterling Rd., Brockton, Mass. 02401

[21] Appl. No.: 238,934

[22] Filed: May 6, 1994

[51] Int. Cl.$^6$ .............................................. B23B 35/00
[52] U.S. Cl. .......................................... 492/13; 492/19
[58] Field of Search ............................ 492/13, 19, 14; 16/111 R, 116 R; 15/230.11

[56] References Cited

U.S. PATENT DOCUMENTS

| 4,634,151 | 1/1987 | Holt | 16/114 R |
| 4,794,667 | 1/1989 | Nelson et al. | 16/114 R |
| 4,838,986 | 6/1989 | Rhoades et al. | 492/13 X |

Primary Examiner—Irene Cuda
Attorney, Agent, or Firm—John P. McGonagle

[57] ABSTRACT

An improved roofing handroller for both press-welding and/or sealing overlapping edges of roofing material sheets together. The present invention provides a roofing handroller comprising a body defining a handle, two extended L-shaped roller bearing sections, each attached at an end of the handle, and two rollers, each rotatably mounted on a roller bearing section.

2 Claims, 4 Drawing Sheets

ROOFING HANDROLLER

BACKGROUND OF THE INVENTION

This invention relates generally to apparatus for joining sheets of roofing material, and in particular to an improved handroller for both press-welding and/or sealing overlapping edges of such sheets together.

Pliable sheets of sealable materials are commonly used in many industrial, environmental and civil construction applications, especially the roofing industry. Sealable materials used in the roofing industry generally use one of three types of seams for joining the sealable materials, i.e., heat seal, adhesive/bond seal, and self-adhesive seal. Typically, in a roofing application, large sheets of materials are placed on the roof with their edges overlapping. For instance, a single-ply thermoplastic sheet is often utilized as a roofing membrane to prevent leakage of water through a roof. When using adhesive/bond or self-adhesive seals, the overlapping edges are press-welded to one another. When using thermo-plastic materials, the overlapping edges are heat welded to one another along or within the overlap. The heat sealing process is done manually by an artisan who separates the overlapping edges along the overlap and then heats the separated edges, e.g., by directing hot air between the separated edges with a blow gun or hot air device. When heated sufficiently, the surfaces of the separated edges liquify. The edges are then pressed together to provide a seam or tack-weld between the overlapping edges which joins the sheets together when it cools. Typically a moveable compressing means such as a handroller is used to press the edges together, regardless of the type of seams used.

An example of a roofing method using thermally sealable materials is disclosed in U.S. Pat. No. 4,894,112, issued to Glenn W. Lippman on Jan. 16, 1990, said patent being incorporated herein by reference. Referring to the Lippman patent, specifically FIGS. 4, 5 and 6, there is disclosed a typical prior art handroller used in the above-described roofing method. This is also the standard roller used for joining any of the three general types of seams in use in the roofing industry. The handroller 100 is comprised of a cylindrical handle with a single roller 101. The roller 101 is made of silicone rubber for heated seams, and metal or silicone rubber for adhesive/bond and self-adhesive seams. The handroller 100 is used to seal or weld overlapping edges of sealable materials together, which sheets are laying on a surface. To maximize the application of downward force and yet move the handroller, the handroller is preferably held at an approximate 45° angle. This angle may vary, however, anywhere from 30° to 90° depending upon the strength of the artisan using the handroller and the amount of pressure needed to press the sheets together. When sealing materials require substantial pressure, it may be necessary to hold the prior art handroller at an angle approaching 90°.

As may be seen from the Lippman patent, especially FIG. 4, the application of the handroller to the edges requires a reasonable amount of strength in the artisan's wrist and forearm. Regardless of the artisan's strength, over time, e.g. a workday, the relentless pressing down on the handroller will substantially weaken the artisan's strength. From a practical point of view, the inventor has found that edges and seams treated toward the end of a workday are considerably inferior to those treated nearer to the beginning of the workday. Artisans in this field also experience chronic muscle fatigue, i.e., tendinitis, especially in their wrists and forearms.

SUMMARY OF THE INVENTION

In view of the disadvantages inherent in the handrollers now present in the prior art, the present invention provides an improved handroller for use in roofing applications. As such the general purpose of the present invention, which will be described subsequently in greater detail, is to provide a new and improved roofing handroller which substantially reduces the strain on an artisan's wrist and forearm when used.

To attain this, the present invention provides a roofing handroller comprising a body defining a handle, two extended L-shaped axles, each attached at an end of the body, and two rollers, each rotatably mounted on an axle.

These together with other objects of the invention, along with various features of novelty which characterize the invention, are pointed out with particularity in the claims annexed hereto and forming a part of this disclosure. For a better understanding of the invention, its operating advantages and the specific objects attained by its uses, reference should be had to the accompanying drawings and descriptive matter in which there is illustrated a preferred embodiment of the invention.

DETAILED DESCRIPTION OF THE INVENTION

Figure 1:
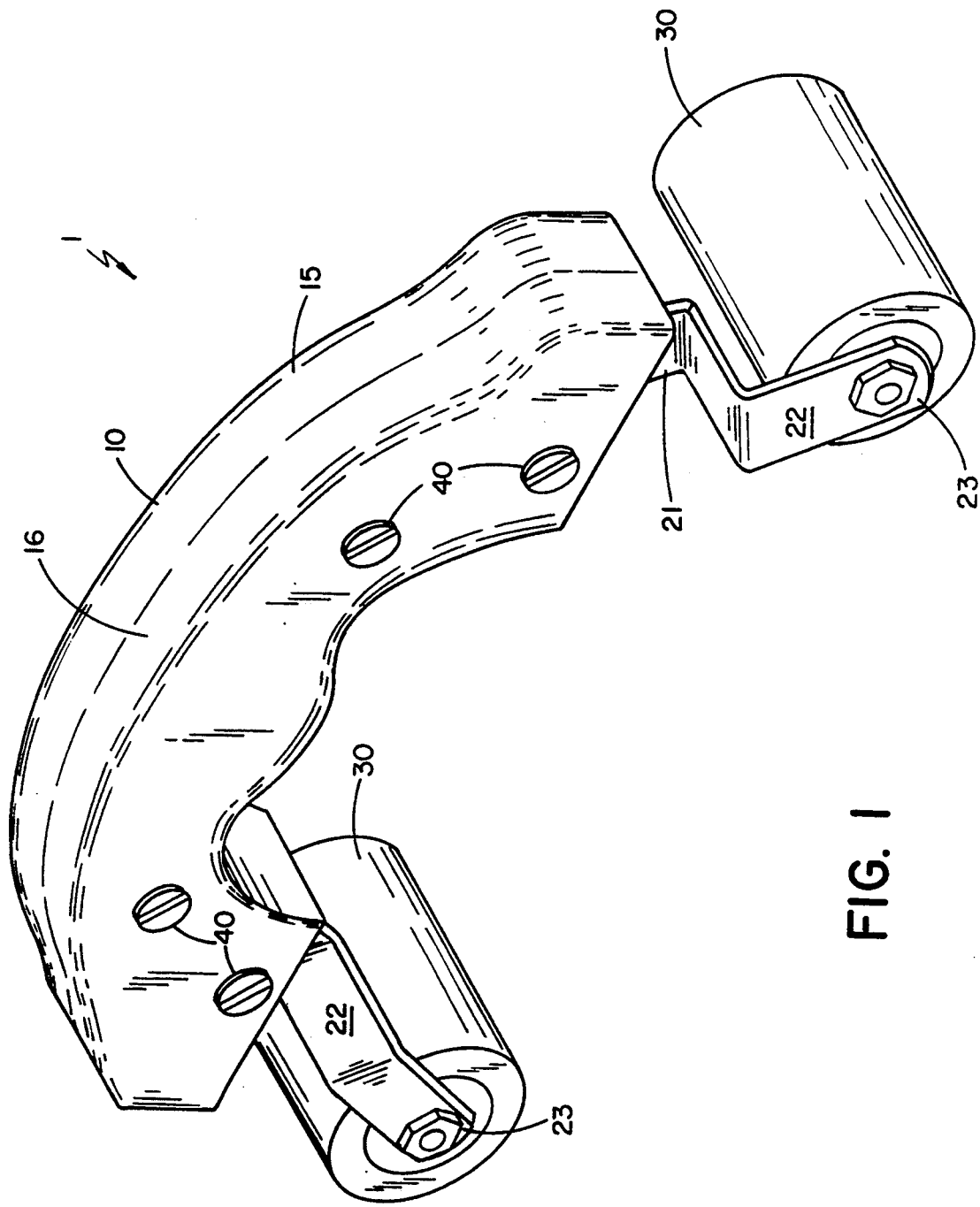
FIG. 1 is a perspective view of the invention.
Figure 2:
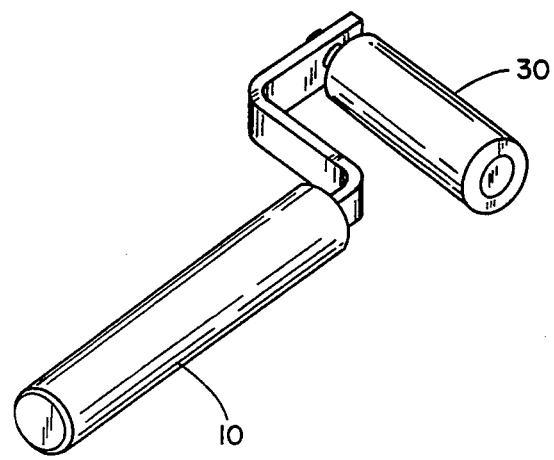
FIG. 2 is a perspective view of a prior art device.
Figure 3:
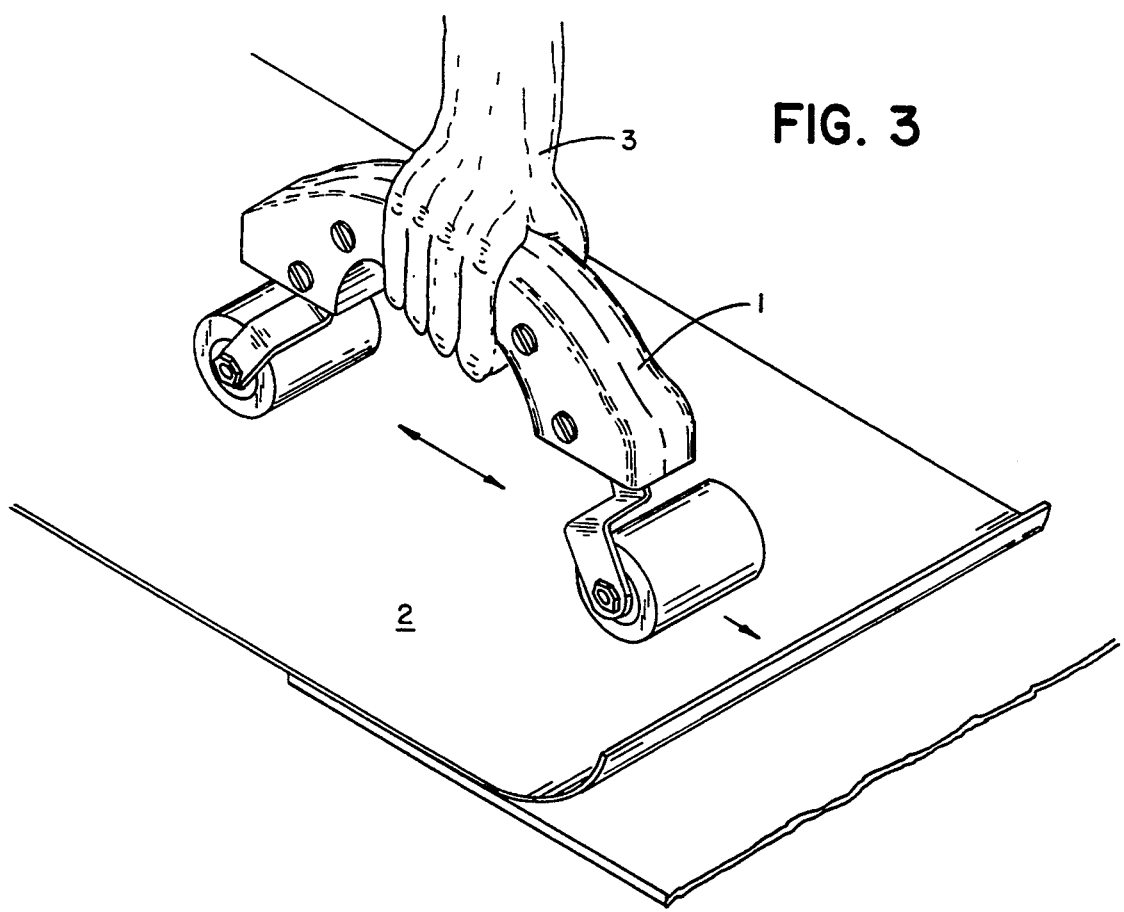
FIG. 3 is a perspective view of the invention in operation.
Figure 5:
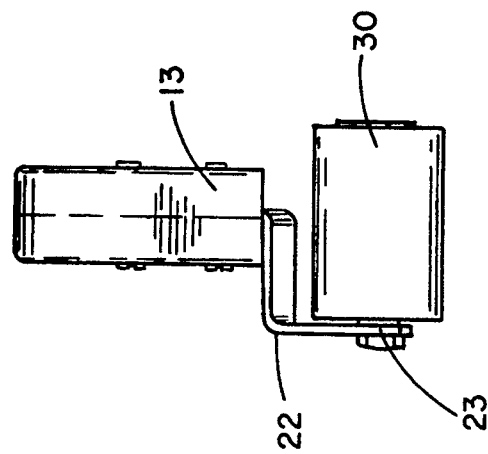
FIG. 5 is a front elevational view of the invention.
Figure 4:
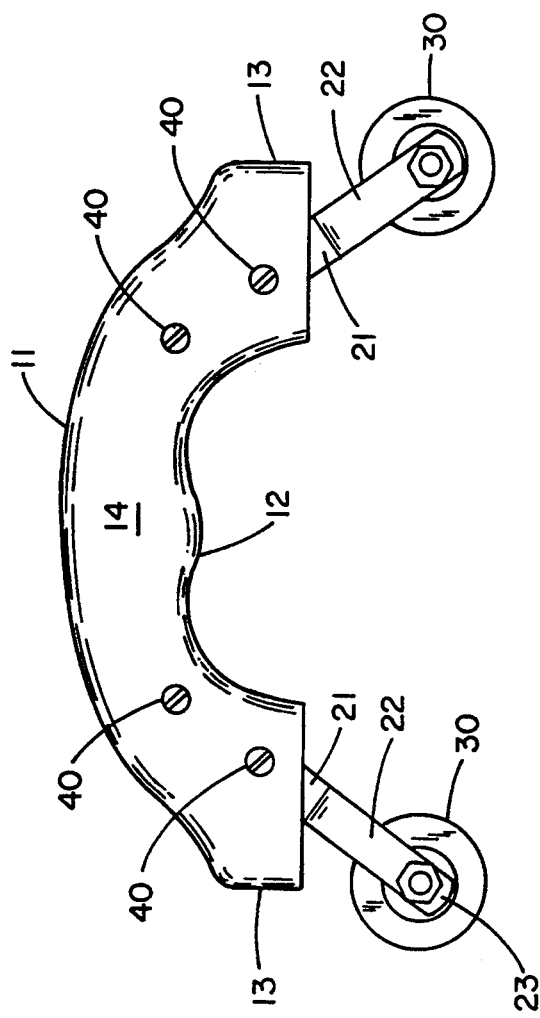
FIG. 4 is a side elevational view of the invention.

Referring to the drawings in detail wherein like elements are indicated by like numerals, there is shown an embodiment of the invention 1 incorporating a roofing handroller. FIG. 2 illustrates a roofing handroller common to the prior art. FIGS. 1, and 3–6 disclose the roofing handroller of the instant invention. The handroller 1 is comprised of a body 10 defining a handle which extends generally longitudinal in a plane parallel to the surface 2 to be worked on. The body/handle 10 has a top surface 11, an under surface 12, two ends 13, two external side surfaces 14 and two spaced flange pieces 20 extending from the handle ends 13. Each flange piece 20 has a proximal end 26 attached to said handle 10 and a distal end 23 extending away from the body under surface 12, at an approximate 45° angle. Each flange piece 20 is comprised of a straight, flat extender section 21 terminating in a transversely oriented L-shaped roller bearing section 22. The extender sections 21 lie in vertical planes generally parallel to the planes of the handle side surfaces 14. A roller 30 with an internal axle is rotatably mounted on the distal end 23 of said L-shaped roller bearing section 22.

The handle top surface 11 preferably is convex in a direction longitudinally of the handle 10 and the under surface 12 is preferably substantially concave in a direction longitudinally of the handle 10 to facilitate gripping of the handle 10 by a human hand 3. The sides 14 are preferably flat in a transverse direction and have a width such that the handle 10 can be readily gripped by the human hand 3 and will fit in the palm (not shown). At the same time, the width is sufficient to distribute the force of the hand 3 over a relatively wide area. The top and under surfaces 11, 12 are flat, but can be any strongly grippable form, such as a pistol-type grip. The length of the flange pieces 20 and the size of the rollers 30 are such that the axis of the rollers 30 are not close to the handle 10. The distance between the handle under surface 12 and the surface 2 being worked on provides a safe spacing between the fingers and thumb of the artisan's hand 3 and the surface 2 being worked on.

In use the artisan either leans over and on the handle 10 while holding it, thereby applying a strong, but comfortable, uniform pressure via the rollers 30 to the surface 2 being worked on. Alternatively, the artisan pushes against the handle 10 while holding it, thereby also applying a strong, but comfortable, uniform pressure via the rollers 30 to the surface 2 being worked on. The handroller 1 of the instant invention brings into play the artisan's larger arm and shoulder muscles and substantially lessens the strain on the artisan's smaller wrist and forearm muscles.

The handle 10 of the instant handroller is preferably made from wood, thereby providing comfort and strength. The flange pieces 20 are made from steel for strength. The rollers 30, depending upon the specific roofing application, are made from stainless steel or silicone rubber.

Figure 6:
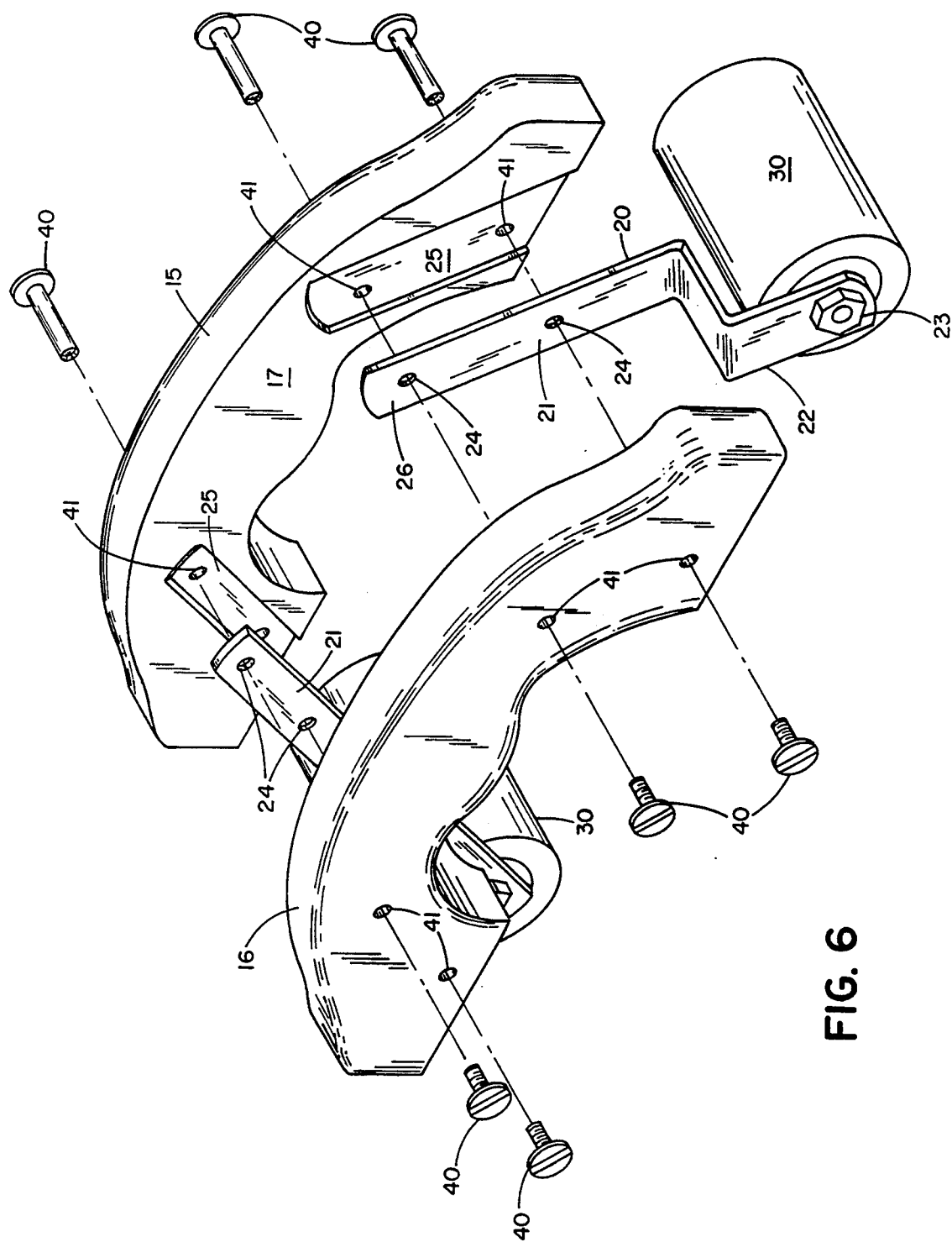
FIG. 6 is an exploded view of the invention illustrated in FIG. 1.

FIG. 6 illustrates one method of assembling the invention. The handle body 10 is comprised of two halves 15, 16 which are mirror images of each other. The halves 15, 16 have internal facing side surfaces 18, 19, respectively. The internal facing side surfaces 18, 19 each have two notches 25, the depth of each being equal to one-half the thickness of a straight end section 21. When the halves 15, 16 are joined together, the notches 25 form sockets for holding the extended sections 21. Each handle half 15, 16 has four corresponding apertures 41 formed therein. Each extender section 21 has two apertures 24 corresponding to two of the half apertures 41 formed therein. The handle halves 15, 16 and extender sections 21 are held together by means of four fasteners 40 protruding through the four corresponding apertures 41 formed in each half 15, 16 and each set of apertures 24 formed in each of the extender sections 21.

It is understood that the above-described embodiment is merely illustrative of the application. Other embodiments may be readily devised by those skilled in the art which will embody the principles of the invention and fall within the spirit and scope thereof.

I claim:

1. A roofing handroller for application to roofing material surfaces, comprising:

a body defining a handle which extends generally longitudinal in a plane parallel to the roofing material surface to be worked on, said body having a top surface, an under surface, two ends, and two external side surfaces, said handle body being comprised of two halves which are mirror images of each other, the halves having internal facing side surfaces, each internal facing side surface having two notches;

two spaced flange pieces extending from the handle ends, each flange piece having a proximal end attached to said handle and a distal end extending away from the body under surface, at an approximate 45° angle;

wherein each flange piece is comprised of a straight, flat extender section terminating in a transversely oriented L-shaped roller bearing section, said extender sections lying in vertical planes generally parallel to the planes of the handle side surfaces, said roller being rotatably mounted on the distal end of said L-shaped roller bearing section;

wherein each notch has a depth equal to one-half the thickness of a straight, flat extender section, wherein the notches are adapted to form sockets for holding the extender sections when the halves are joined together; and a roller with an internal axle rotatably mounted on the distal end of each said flange piece.

2. A roofing handroller as recited in claim 1, wherein:

each handle half has four corresponding apertures formed therein;

each extender section has two apertures corresponding to two of the half apertures formed therein; and wherein said handle halves and said extender sections are held together by means of four fasteners protruding through the four corresponding apertures formed in each half and each set of apertures formed in each of the extender sections.

* * * * *